US009620162B1

United States Patent
Haralson (10) Patent No.: US 9,620,162 B1
(45) Date of Patent: Apr. 11, 2017

(54) DATA STORAGE DEVICE BOOSTING PRELASE BIAS WHILE OVER DATA SECTOR FOR HEAT ASSISTED MAGNETIC RECORDING

(71) Applicant: Western Digital Technologies, Inc., Irvine, CA (US)

(72) Inventor: Phillip S. Haralson, Huntington Beach, CA (US)

( * ) Notice: Subject to any disclaimer, the term of this patent is extended or adjusted under 35 U.S.C. 154(b) by 0 days.

(21) Appl. No.: 15/086,543

(22) Filed: Mar. 31, 2016

(51) Int. Cl.
*G11B 5/00* (2006.01)
*G11B 5/03* (2006.01)
*G11B 5/09* (2006.01)
*G11B 7/1263* (2012.01)
*G11B 5/596* (2006.01)

(52) U.S. Cl.
CPC ........ *G11B 7/1263* (2013.01); *G11B 5/59688* (2013.01); *G11B 2005/0021* (2013.01)

(58) Field of Classification Search
CPC ........... G11B 7/131; G11B 7/13; G11B 7/127; G11B 7/1374; G11B 5/00; G11B 5/66; G11B 5/74; G11B 5/3903; G11B 2005/0021; G11B 5/314; G11B 20/1009; G11B 5/09; G11B 2220/90; G11B 5/02; G11B 5/12; G11B 5/024; G11B 7/126; G11B 7/1267; G11B 7/0045; B82Y 25/00; B82Y 10/00
USPC ...... 369/120, 121, 122, 44.37, 13.01, 13.02, 369/112.23; 360/59, 313, 131
See application file for complete search history.

(56) References Cited

U.S. PATENT DOCUMENTS

| | | | |
|---|---|---|---|
| 7,672,072 B1 | 3/2010 | Boyle et al. | |
| 8,081,542 B1 * | 12/2011 | Grobis | B82Y 10/00 360/131 |
| 8,174,780 B1 | 5/2012 | Tsai et al. | |
| 8,406,090 B2 | 3/2013 | Juang et al. | |
| 8,406,091 B2 | 3/2013 | Shimazawa et al. | |
| 8,456,980 B1 | 6/2013 | Thayamballi | |
| 8,477,569 B2 * | 7/2013 | Erden | G11B 5/02 369/13.01 |
| 8,605,763 B2 | 12/2013 | Castillo et al. | |
| 8,619,508 B1 | 12/2013 | Krichevsky et al. | |
| 8,773,957 B1 * | 7/2014 | Champion | G11B 20/182 369/13.02 |
| 8,787,125 B1 | 7/2014 | Lee | |
| 8,854,929 B1 | 10/2014 | Champion et al. | |
| 8,897,103 B2 | 11/2014 | Alex | |
| 8,902,718 B1 | 12/2014 | Ruan et al. | |
| 8,922,929 B1 | 12/2014 | Ruan et al. | |

(Continued)

OTHER PUBLICATIONS

Alexander Krichevsky, et al., U.S. Appl. No. 14/633,111, filed Feb. 26, 2015, 17 pages.

(Continued)

*Primary Examiner* — Nabil Hindi (57) ABSTRACT

A data storage device is disclosed comprising a disk comprising a plurality of data sectors and a plurality of servo sectors, and a head actuated over the disk, wherein the head comprises a laser configured to heat the disk while writing data to the disk. When the head is over a first data sector not being written, a first prelase bias is applied to the laser, and when the head is over a servo sector, a second, lower prelase bias is applied to the laser. When the head is over a second data sector being written, a write bias higher than the first prelase bias is applied to the laser.

18 Claims, 5 Drawing Sheets

(56) References Cited

U.S. PATENT DOCUMENTS

| | | |
|---|---|---|
| 8,929,186 B1 | 1/2015 | Sharma et al. |
| 9,019,646 B2 | 4/2015 | Rausch et al. |
| 9,025,421 B1 | 5/2015 | Prabhu et al. |
| 9,074,941 B1 | 7/2015 | Krichevsky et al. |
| 9,099,144 B1 | 8/2015 | Chia et al. |
| 9,117,479 B1 | 8/2015 | Madison et al. |
| 9,153,266 B1 | 10/2015 | Chia et al. |
| 9,171,575 B1 | 10/2015 | Alex et al. |
| 9,236,081 B1 | 1/2016 | Chu et al. |
| 9,384,774 B1 | 7/2016 | Nookala et al. |

OTHER PUBLICATIONS

Phillip S. Haralson, U.S. Appl. No. 14/682,021, filed Apr. 8, 2015, 14 pages.

* cited by examiner

DATA STORAGE DEVICE BOOSTING PRELASE BIAS WHILE OVER DATA SECTOR FOR HEAT ASSISTED MAGNETIC RECORDING

BACKGROUND

Data storage devices such as disk drives may comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface with a laser during write operations in order to decrease the coercivity of the magnetic medium, thereby enabling the magnetic field generated by the write coil to more readily magnetize the disk surface.

Figure 1:
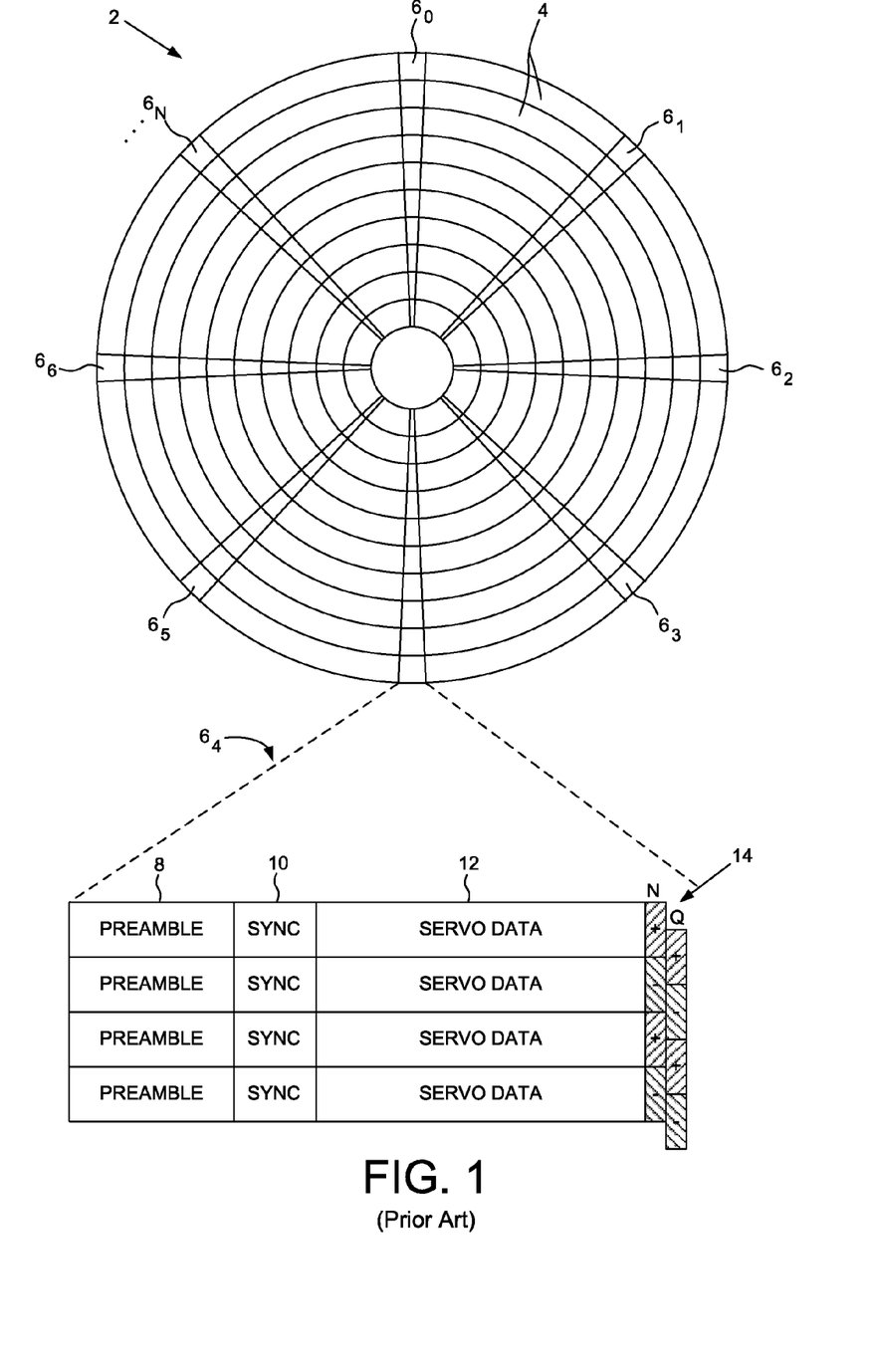
FIG. 1 shows a prior art disk format comprising a plurality of data tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
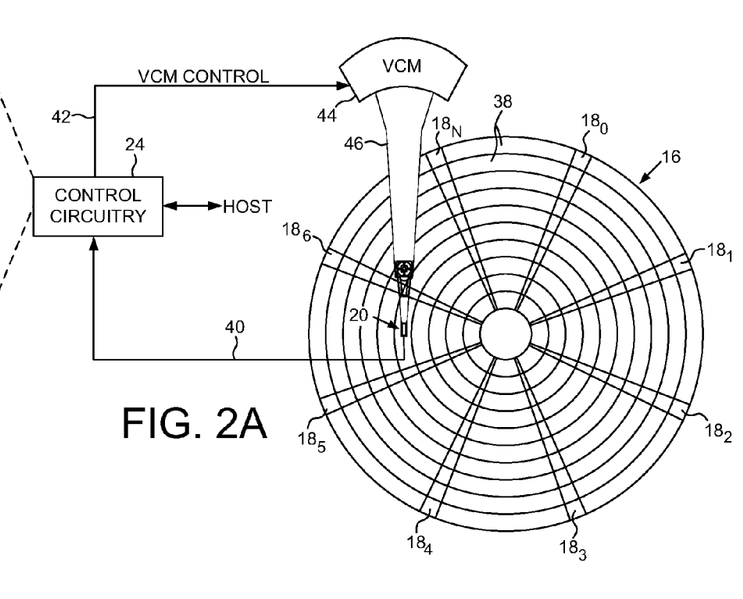
FIG. 2A shows a data storage device in the form of a disk drive according to an embodiment comprising a head actuated over a disk, wherein the head comprises a laser configured to heat the disk while writing data to the disk.

FIG. 2A shows a data storage device in the form a disk drive according to an embodiment comprising a disk 16 comprising a plurality of data sectors and a plurality of servo sectors $18_0$-$18_N$, and a head 20 actuated over the disk 16, wherein the head 20 (FIG. 2B) comprises a laser 22 configured to heat the disk while writing data to the disk. The disk drive further comprises control circuitry 24 configured to execute the flow diagram of FIG. 2C to adjust a prelase bias applied to the laser 22 during a write operation (block 26). When the head is over a first data sector not being written (block 28), a first prelase bias is applied to the laser (block 30), and when the head is over a servo sector (block 32), a second, lower prelase bias is applied to the laser (block 34). When the head is over a second data sector being written (block 28), a write bias higher than the first prelase bias is applied to the laser (block 36).

In the embodiment of FIG. 2A, a plurality of concentric servo tracks 38 are defined by the servo sectors $18_0$-$18_N$, wherein concentric data tracks are defined relative to the servo tracks at the same or different radial density and each data track comprises a plurality of data sectors. The control circuitry 24 processes a read signal 40 emanating from the head 20 to demodulate the servo sectors and generate a position error signal (PES) representing an error between the actual position of the head and a target position relative to a target track. The control circuitry 24 filters the PES using a suitable compensation filter to generate a control signal 42 applied to a voice coil motor (VCM) 44 which rotates an actuator arm 46 about a pivot in order to actuate the head 20 radially over the disk 16 in a direction that reduces the PES. The servo sectors $18_0$-$18_N$ may comprise any suitable head position information, such as a track address for coarse positioning and servo bursts for fine positioning. The servo bursts may comprise any suitable pattern, such as an amplitude based servo pattern or a phase based servo pattern.

Figure 2B:
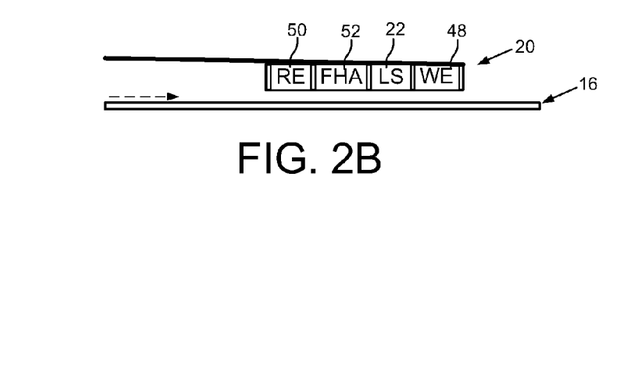
FIG. 2B shows a head according to an embodiment comprising a write element, a read element, a fly height actuator, and a laser.
Figure 2C:
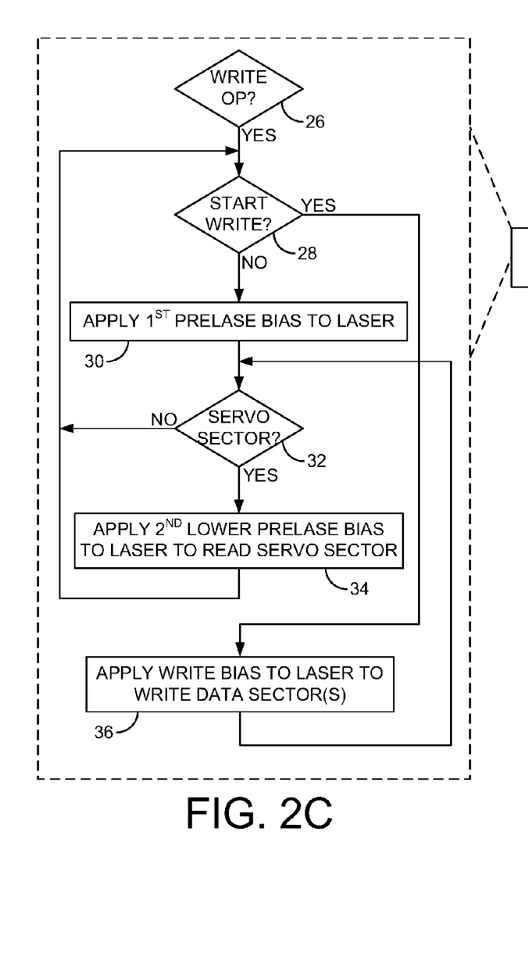
FIG. 2C is a flow diagram according to an embodiment wherein during a write operation, a first prelase bias is applied to the laser when the head is over data sectors not being written, and a second, lower prelase bias is applied to the laser when the head is over a servo sector.

In the embodiment of FIG. 2B, the head 20 comprises a suitable write element 48 (e.g., an inductive coil), a suitable read element 50 (e.g., a magnetoresistive element), and a suitable fly height actuator (FHA) 52 configured to actuate the head 20 vertically over the disk 16. Any suitable FHA 52 may be employed, such as a heater that actuates through thermal expansion, or a piezoelectric actuator that actuates through mechanical deflection. The head 20 may comprise any suitable laser 22 for heating the disk 16, such as a laser diode, as well as any suitable optics for focusing the light emitted by the laser 22 onto the disk, such as a waveguide and a near field transducer (NFT).

When an electrical bias is applied to the laser 22 (e.g., a current or voltage) during a write operation, a self-heating effect may cause a thermal expansion of one or more components of the head toward the disk surface which results in a fly height transient. In one embodiment, this fly height transient may be reduced by preheating the laser with a prelase bias prior to the head reaching the target data sector to be written. In one embodiment, the fly height transient over the target data sector will decrease as the amplitude of the prelase bias increases toward the write bias. However, as the amplitude of the prelase bias increases, there is a corresponding degradation of the data previously written on the disk (e.g., previously written data sectors and servo sectors). That is, the output power of the laser and resulting heating of the disk surface due to the prelase bias may increase the thermal decay of the previously recorded data. In one embodiment, a first prelase bias is applied to the laser while the head is over non-written data sectors, and a second, lower prelase bias is applied to the laser while the head is reading a servo sector. The degradation of previously written data sectors is then compensated by refreshing the data sectors based on a refresh interval that is configured based on the amplitude of the first prelase bias. In one embodiment, the amplitude of the second, lower prelase bias used to read the servo sectors results in significantly less thermal decay of the servo data while still providing at least some preheating of the laser.

Figure 3:
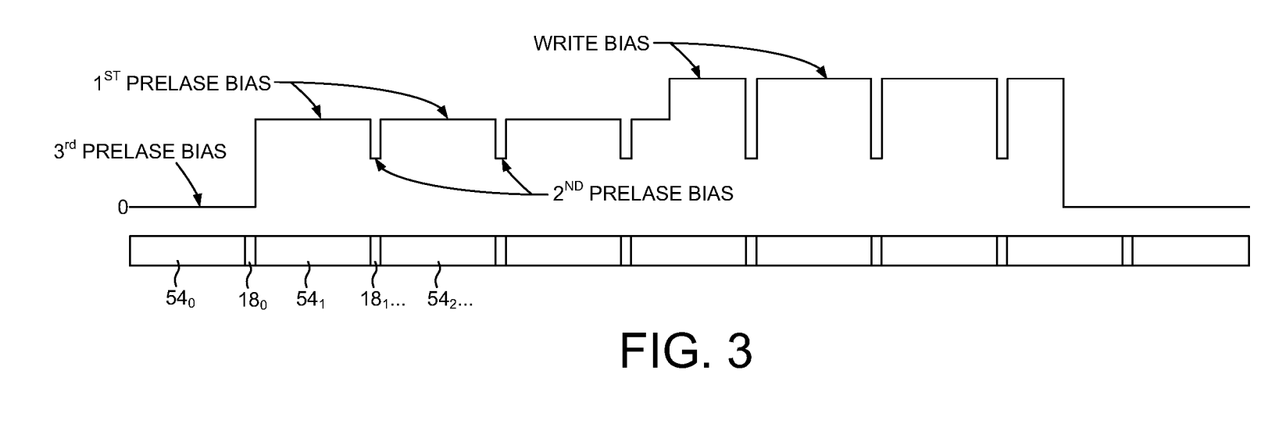
FIG. 3 shows a timing diagram according to an embodiment wherein the laser bias is zero during non-write modes, increased to a first prelase bias during a write operation while the head is over data sectors not being written, decreased to a second prelase bias while reading the servo sectors, and increased to a write bias when writing the data sectors of the write operation.

FIG. 3 shows a timing diagram according to an embodiment wherein during a write operation the prelase bias is adjusted based on whether the head is over a non-written data sector 54, a servo sector 18, or a written data sector 54. During a non-write mode preceding the write operation (e.g., during an idle mode or a read operation), the prelase bias is set to zero in order to conserve power and extend the life of the laser 22. During a write operation when the head reaches a data sector 54₁ preceding the target data sector(s) to be written, the first prelase bias is applied to the laser in order to preheat the laser, wherein the first prelase bias causes degradation of the data sector 54₁. When the head reaches servo sector 18₁, a second, lower prelase bias is applied to the laser so that the degradation of the servo sector is significantly less than the degradation of the data sector 54₁. This adjustment to the prelase bias is repeated until the head reaches the data sector being written at which time the bias applied to the laser is increased to a write bias so as to enable data to be written to the disk.

Any suitable amplitudes may be configured for the first prelase bias, the second prelase bias, and the write bias. In one embodiment, the amplitudes of the bias settings may be calibrated by writing/reading test data to/from the disk and adjusting the amplitudes based on a quality metric of the recorded data. In one embodiment, the amplitude of the first prelase bias may also be configured based on a desired recovery rate of the recorded data. For example, when recording a video stream the recovery rate of the recorded data may be reduced since the quality of a video stream is not significantly degraded due to a periodic inability to read a data sector, and therefore the amplitude of the first prelase bias and the corresponding degradation of the previously recorded data sectors may be increased. Also in an embodiment described below, the amplitude of the first prelase bias may be configured based on how frequently the data sectors may be refreshed. That is, the amplitude of the first prelase bias may be increased if the refresh interval of a refresh zone is decreased.

In one embodiment, the first prelase bias shown in FIG. 3 generates a first prelase power output by the laser, the second prelase bias generates a second prelase power output by the laser, the write bias generates a write power output by the laser, and the second prelase power is configured to be in a range from five percent to sixty five percent of the write power. In this embodiment, configuring a lower amplitude for the second prelase bias prevents degradation of the servo sectors, whereas configuring a higher amplitude reduces the fly height transient due to the cooling effect while reading a servo sector. In one embodiment, the first prelase power is at least ten percent greater than the second prelase power, wherein a higher prelase power reduces the fly height transient when writing to the target data sector but increases the degradation of the non-written data sector(s) preceding the target data sector thereby requiring a shorter refresh interval.

Figure 4A:
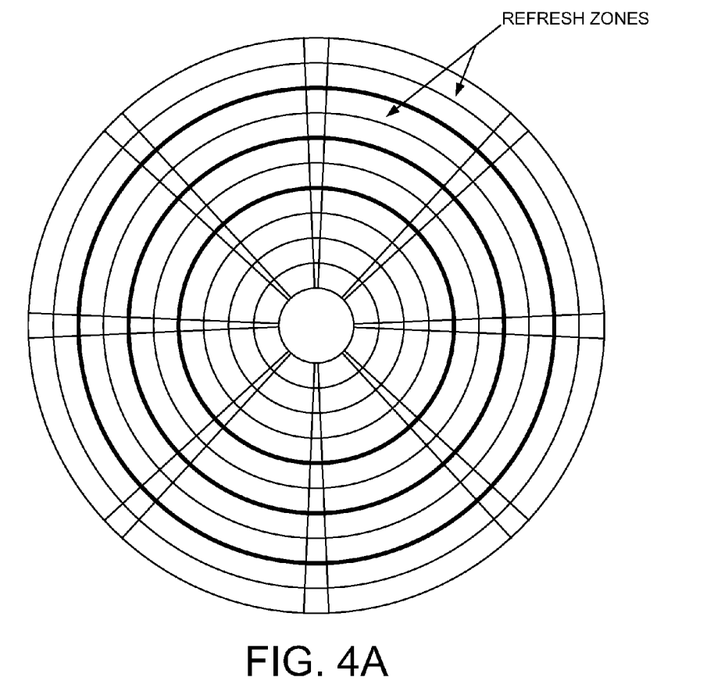
FIG. 4A shows an embodiment wherein the data tracks are banded together to form refresh zones on the disk.

FIG. 4A shows an embodiment wherein the data tracks are banded together to form refresh zones on the disk. The example of FIG. 4A shows the data tracks banded to form four refresh zones; however, any suitable number of refresh zones may be employed. Any suitable known algorithms for refreshing the data sectors of a refresh zone may be employed, wherein in one embodiment a conventional refresh algorithm is augmented by taking into account the degrading effect of the prelase bias when the head is over non-written data sectors.

Figure 4B:
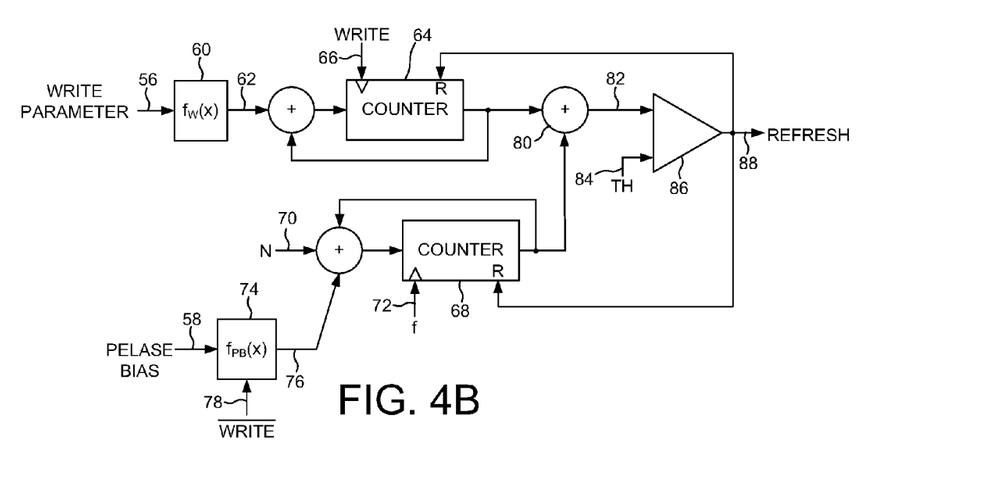
FIG. 4B shows an embodiment wherein a refresh interval of a refresh zone is configured based on an amplitude of the prelase bias to compensate for the degradation of the data sectors.

FIG. 4B shows an embodiment for refreshing the data sectors of a refresh zone based on a write parameter 56 during a write operation, and based on an amplitude of the prelase bias 58 while the head is over non-written data sectors. A first update function f(x) 60 outputs a value 62 that is a function of the write parameter 56 (e.g., ambient temperature). The value 62 is accumulated by a counter 64 when enabled (clocked) by a write signal 66 at each write operation. A counter 68 accumulates a constant value N 70 at a frequency f set by a frequency signal 72, wherein the value N 70 accounts for a general thermal degradation of the recorded data over time. A second update function 74 outputs a value 76 that is a function of the amplitude of the prelase bias 58 when reading non-written data sectors during a write operation (as enabled by signal 78). The output of counters 64 and 68 are combined at adder 80, and the output 82 compared to the threshold 84 at comparator 86. When the output 82 exceeds the threshold 84, the data sectors of the refresh zone are refreshed (rewritten), and both counters 64 and 68 are reset by refresh signal 88 after performing the refresh operation. In this embodiment, the prelase bias effectively accelerates the thermal degradation of the recorded data and therefore reduces the refresh interval by increasing the value accumulated by the thermal degradation counter 68.

Figure 4C:
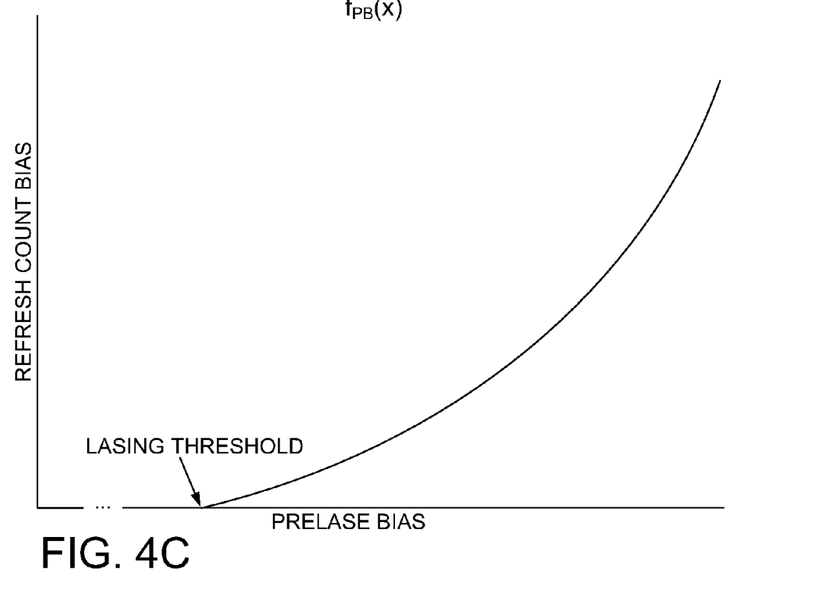
FIG. 4C illustrates an embodiment wherein the refresh count bias increases as the amplitude of the prelase bias increases.

FIG. 4C shows a suitable function 74 employed in FIG. 4B for reducing the refresh interval based on the amplitude of the prelase bias. In this embodiment, the laser outputs little to no power until the amplitude of the prelase bias reaches a lasing threshold of the laser. Therefore in this embodiment, the prelase bias does not affect the refresh interval until the amplitude reaches the lasing threshold as shown in FIG. 4C, after which the refresh interval is reduced (by increasing the counter bias) according to any suitable polynomial (first order, second order, third order, etc.). Accordingly, this embodiment may enable higher quality writes due to a higher amplitude prelase bias while compensating for the increased degradation by refreshing the data sectors more frequently.

Figure 4D:
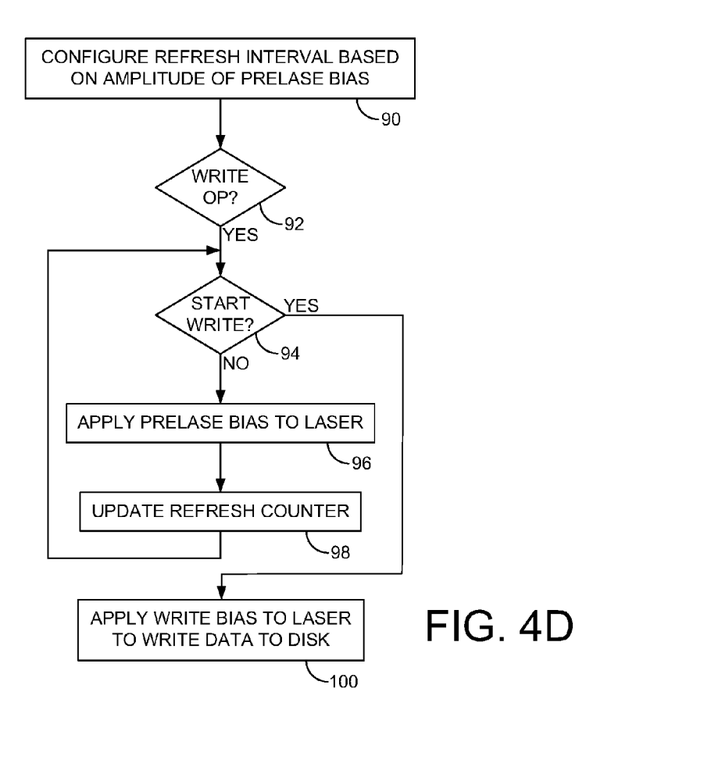
FIG. 4D is a flow diagram according to an embodiment wherein a refresh interval of a refresh zone is configured based on an amplitude of the refresh bias.

FIG. 4D is a flow diagram according to an embodiment wherein a refresh interval is configured based on the amplitude of the prelase bias (block 90). For example, the update function 74 shown in FIG. 4B may generate the counter bias value 76 based on the amplitude of the prelase bias 58. When a write operation is executed (block 92), before the head reaches the target data sector(s) to be written (block 94) the prelase bias is applied to the laser (block 96) at a predetermined number of data sectors preceding the target data sector. A refresh counter (e.g., counter 68 in FIG. 4B) is updated based on the amplitude of the prelase bias (block 98). When the head reaches the target data sector, a write bias is applied to the laser in order to write the target data sector(s) (block 100).

The refresh interval of a refresh zone may be configured in any suitable manner based on the amplitude of the prelase bias. In one embodiment, instead of, or in addition to, biasing a refresh counter such as shown in FIG. 4B, the refresh threshold 84 may be adjusted (e.g., reduced) based on the amplitude of the prelase bias. In yet other embodiments, the function 74 shown in FIG. 4B for generating the counter bias value 76 may be adjusted over time to compensate for changes in operating conditions, such as changes in environmental conditions (e.g., ambient temperature).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising a plurality of data sectors and a plurality of servo sectors;
   a head actuated over the disk, wherein the head comprises a laser configured to heat the disk while writing data to the disk; and
   control circuitry configured to adjust a prelase bias applied to the laser during a write operation by at least:
      when the head is over a first data sector not being written, apply a first prelase bias to the laser;
      when the head is over a servo sector, apply a second prelase bias to the laser; and
      when the head is over a second data sector being written, apply a write bias to the laser,
   wherein:
      the second prelase bias is lower than the first prelase bias;
      the write bias is higher than the first prelase bias;
      the first prelase bias generates a first prelase power that is output by the laser;
      the second prelase bias generates a second prelase power that is output by the laser;
      the write bias generates a write power output by the laser; and
      the second prelase power is at least five percent of the write power.

2. The data storage device as recited in claim 1, wherein the second prelase power is less than sixty five percent of the write power.

3. The data storage device as recited in claim 1, wherein the first prelase power is at least ten percent greater than the second prelase power.

4. The data storage device as recited in claim 1, wherein during a read operation the control circuitry is further configured to apply a third prelase bias to the laser less than the second prelase bias.

5. The data storage device as recited in claim 1, wherein the first prelase bias is high enough to degrade the first data sector.

6. The data storage device as recited in claim 5, wherein the control circuitry is further configured to refresh the first data sector by at least rewriting the first data sector.

7. The data storage device as recited in claim 6, wherein the control circuitry is further configured to configure a refresh interval of the first data sector based on an amplitude of the first prelase bias.

8. The data storage device as recited in claim 7, wherein the control circuitry is further configured to configure the refresh interval to be inversely proportional to the amplitude of the first prelase bias.

9. A data storage device comprising:
   a disk;
   a head actuated over the disk, wherein the head comprises a laser configured to heat the disk while writing data to the disk; and
   control circuitry configured to:
      when the head is over a first data sector not being written, apply a prelase bias to the laser;
      when the head is over a second data sector being written, apply a write bias to the laser higher than the prelase bias;
      configure a refresh interval of the first data sector based on an amplitude of the prelase bias; and
      refresh data on the disk based on the refresh interval.

10. A method of operating a data storage device comprising, the method comprising:
   when a head is over a first data sector on a disk not being written, applying a first prelase bias to a laser configured to heat the disk while writing data to the disk;
   when the head is over a servo sector on the disk, applying a second prelase bias to the laser; and
   when the head is over a second data sector on the disk being written, applying a write bias to the laser,
   wherein:
      the second prelase bias is lower than the first prelase bias;
      the write bias is higher than the first prelase bias;
      the first prelase bias generates a first prelase power that is output by the laser;
      the second prelase bias generates a second prelase power that is output by the laser;
      the write bias generates a write power output by the laser; and
      the second prelase power is at least five percent of the write power.

11. The method as recited in claim 10, wherein the second prelase power is less than sixty five percent of the write power.

12. The method as recited in claim 10, wherein
   the first prelase power is at least ten percent greater than the second prelase power.

13. The method as recited in claim 10, wherein during a read operation the method further comprises applying a third prelase bias to the laser less than the second prelase bias.

14. The method as recited in claim 10, wherein the first prelase bias is high enough to degrade the first data sector.

15. The method as recited in claim 14, further comprising refreshing the first data sector by rewriting the first data sector.

16. The method as recited in claim 15, further comprising configuring a refresh interval of the first data sector based on an amplitude of the first prelase bias.

17. The method as recited in claim 16, further comprising configuring the refresh interval to be inversely proportional to the amplitude of the first prelase bias.

18. A method of operating a data storage device, the method comprising:
   when a head is over a first data sector on a disk not being written, applying a prelase bias to a laser configured to heat the disk while writing data to the disk;
   when the head is over a second data sector on the disk being written, applying a write bias to the laser higher than the prelase bias; and
   configuring a refresh interval of the first data sector based on an amplitude of the prelase bias; and
   refreshing data on the disk based on the refresh interval.

* * * * *